United States Patent
Wobak et al.

(10) Patent No.: US 11,916,616 B2
(45) Date of Patent: Feb. 27, 2024

(54) NEAR FIELD COMMUNICATION DEVICE HAVING AN EVENT DETECTOR

(71) Applicant: NXP B.V., Eindhoven (NL)

(72) Inventors: Markus Wobak, Graz (AT); Tushar Nagrare, Graz (AT); Olivier Jérôme Célestin Jamin, Sainte Honorine du Fay (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/649,421

(22) Filed: Jan. 31, 2022

(65) Prior Publication Data
US 2022/0271798 A1 Aug. 25, 2022

(30) Foreign Application Priority Data
Feb. 19, 2021 (EP) .................................. 21305206

(51) Int. Cl.
*H04B 5/00* (2006.01)
*H02J 50/80* (2016.01)

(52) U.S. Cl.
CPC ............ *H04B 5/0037* (2013.01); *H02J 50/80* (2016.02); *H04B 5/0043* (2013.01)

(58) Field of Classification Search
CPC ...... H04B 5/00; H04B 5/0025; H04B 5/0037; H04W 4/80
See application file for complete search history.

(56) References Cited

U.S. PATENT DOCUMENTS

| | | | |
|---|---|---|---|
| 8,374,546 B2 | 2/2013 | Maugars et al. | |
| 9,653,942 B2 | 5/2017 | Kim et al. | |
| 10,566,843 B2* | 2/2020 | Khlat | H02J 50/10 |
| 10,819,394 B1 | 10/2020 | Petzel et al. | |
| 2013/0062959 A1 | 3/2013 | Lee et al. | |
| 2016/0126752 A1 | 5/2016 | Vuori et al. | |
| 2020/0379622 A1* | 12/2020 | Pignorel | G06F 3/04162 |

FOREIGN PATENT DOCUMENTS

CN 104578219 A 4/2015

* cited by examiner

*Primary Examiner* — Diana J. Cheng (57) ABSTRACT

In accordance with a first aspect of the present disclosure, a near field communication (NFC) device is provided, comprising: an NFC unit configured to charge an external device under charge by transferring power to said device under charge through an NFC channel; a detection unit configured to detect predefined events occurring on the NFC channel when said power is being transferred to the device under charge; a processing unit configured to control the transferring of power to the device under charge in dependence on the events detected by the detection unit. In accordance with a second aspect of the present disclosure, a corresponding method of operating a near field communication (NFC) device is conceived.

13 Claims, 7 Drawing Sheets

Fig. 7

NEAR FIELD COMMUNICATION DEVICE HAVING AN EVENT DETECTOR

CROSS-REFERENCE TO RELATED APPLICATIONS

This application claims priority under 35 U.S.C. § 119 to European Patent Application No. 21305206.1, filed on 19 Feb. 2021, the contents of which are incorporated by reference herein.

TECHNICAL FIELD

The present disclosure relates to a near field communication device. Furthermore, the present disclosure relates to a corresponding method of operating a near field communication device.

BACKGROUND

Near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g., a tag or a transponder) or an active, typically battery-powered device. An RF field generated by an NFC reader can be used to charge the battery of the secondary device. This process is referred to as wireless charging.

SUMMARY

In accordance with a first aspect of the present disclosure, a near field communication (NFC) device is provided, comprising: an NFC unit configured to charge an external device under charge by transferring power to said device under charge through an NFC channel; a detection unit configured to detect predefined events occurring on the NFC channel when said power is being transferred to the device under charge; a processing unit configured to control the transferring of power to the device under charge in dependence on the events detected by the detection unit.

In one or more embodiments, the processing unit is further configured to disable, at least in part, a receiver comprised in the NFC unit when said power is being transferred to the device under charge.

In one or more embodiments, the processing unit is further configured to enable the receiver in dependence on the events detected by the detection unit.

In one or more embodiments, the processing unit is further configured to interrupt the transferring of power to the device under charge in dependence on the events detected by the detection unit or to conclude an ongoing continuous wave charging phase in dependence on the events detected by the detection unit.

In one or more embodiments, the predefined events include at least one of the following events: a data frame transmitted by the device under charge; a removal of the device under charge from the NFC channel; another communication device being brought into close proximity of the NFC unit.

In one or more embodiments, the detection unit includes a receiver signal monitor configured to monitor signal changes in a receiver path of the NFC unit, wherein said signal changes in the receiver path are indicative of one or more of the predefined events.

In one or more embodiments, the detection unit includes a transmitter current monitor configured to monitor signal changes in a supply current path to a transmitter of the NFC unit, wherein said signal changes in the supply current path are indicative of one or more of the predefined events.

In one or more embodiments, the detection unit further includes a decoder configured to decode inputs provided by the receiver signal monitor and the transmitter current monitor into detected events, and to notify the processing unit of said detected events.

In one or more embodiments, the decoder has settings which are programmable or configurable by a user.

In one or more embodiments, the processing unit is configured to enable and disable the decoder.

In one or more embodiments, the decoder includes a filtering unit configured to filter the inputs provided by the receiver signal monitor and the transmitter current monitor before said inputs are decoded.

In one or more embodiments, the decoder is configured to decode the inputs by detecting predefined patterns in the signal changes in the receiver path and/or the supply current path.

In one or more embodiments, the settings include one or more thresholds used for detecting the predefined patterns in said signal changes.

In accordance with a second aspect of the present disclosure, a method of operating a near field communication (NFC) device is conceived, the NFC device comprising an NFC unit, a detection unit and a processing unit, the method comprising: charging, by the NFC unit, an external device under charge by transferring power to said device under charge through an NFC channel; detecting, by the detection unit, predefined events occurring on the NFC channel when said power is being transferred to the device under charge; controlling, by the processing unit, the transferring of power to the device under charge in dependence on the events detected by the detection unit.

DESCRIPTION OF DRAWINGS

Embodiments will be described in more detail with reference to the appended drawings, in which.

DESCRIPTION OF EMBODIMENTS

Near field communication (NFC) is an established technology for proximity communication for various use cases. Using this technology, a primary device may generate a radio frequency (RF) field at a frequency of 13.56 MHz to power a secondary device. Modulation techniques are used to communicate in both directions. The secondary device may be a passive device (e.g., a tag or a transponder) or an active, typically battery-powered device. An RF field generated by an NFC reader can be used to charge the battery of the secondary device. This process is referred to as wireless charging.

Typical implementations of NFC direct wireless charging make use of a WLC-P (wireless charging poller) device and a WLC-L (wireless charging listener) device. The wireless charging poller may be a standalone reader device which is configured to charge the battery of the wireless charging listener, i.e. a secondary accessory device such as a watch or fitness tracker. Basic standalone WLC-P implementations typically have a single antenna for WLC use cases. In contrast, general NFC devices and especially NFC-enabled mobile devices (such as mobile phones and tablets) can support WLC-P use cases in parallel to conventional NFC use cases (such as payment, ticketing, access control, and tag reading applications) with a single NFC controller connected to NFC and WLC antennas. In that case, time multiplexing methods may be used to enable that only one antenna is actively connected to the NFC controller's radio frequency (RF) modem (i.e., the controller's NFC transceiver). Accordingly, an NFC controller's RF modem may be connected to multiple antennas, including NFC and WLC antennas. In both cases, an NFC controller is connected to a WLC antenna through which the wireless charging operation can be performed.

As used herein, the term "WLC activity" refers to a scenario in which a primary device acts as a WLC-P to charge a WLC-L using a WLC antenna. The duration of typical WLC activities is between several minutes up to several hours. Therefore, the WLC antenna may have to be used by the transmitter of the NFC controller's transceiver for a relatively long time to transfer power to the secondary device. However, the receiver of the RF modem should also remain active, because it should be able to receive, for example, control messages relating to the WLC activity from the secondary device. This, in turn, increases the power consumption of the wireless charging device. Although power saving measures can be implemented during the RF field emission of the wireless charging operation, the NFC transceiver should still be response to external RF events.

Figure 1:
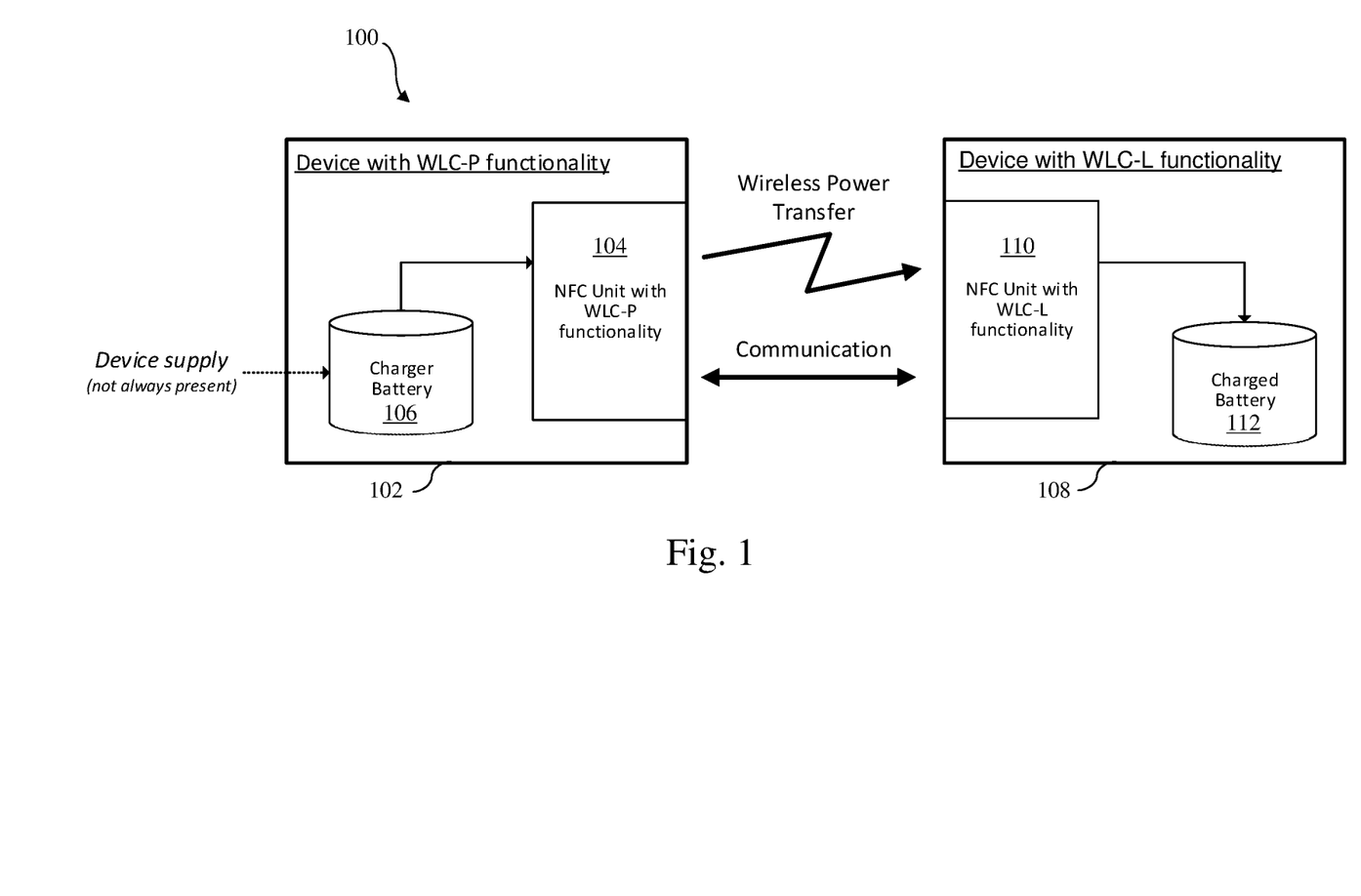
FIG. 1 shows an example of an NFC-based wireless charging system.

FIG. 1 shows an example of an NFC-based wireless charging system 100. The system 100 includes a device with WLC-P functionality 102 configured to transfer power to a device with WLC-L functionality 108 through an NFC channel established between the devices 102, 108. To establish this NFC channel, the device with WLC-P functionality 102 comprises an NFC unit with WLC-P functionality 104, and the device with WLC-L functionality 108 comprises an NFC unit with WLC-L functionality 110. Furthermore, the device with WLC-P functionality 102 comprises a charger battery 106, and the device with WLC-L functionality 108 comprises a charged battery 112 (i.e., a battery that can be charged by the wirelessly transferred power).

Near field communication (NFC) or radio frequency identification (RFID) communication uses a 13.56 MHz RF field to transfer energy from a primary device (e.g., a reader) to a secondary device (e.g., a card device). Modulation techniques are often used for communication purposes. Typical NFC transactions use short RF transactions for payment, ticketing or access use cases. If the secondary card mode device includes an energy storing element (such as a battery), the RF field can also be used for charging said energy storing element. It is noted that technical standards, such as the NFC Forum Wireless Charging (WLC) specification, define how a WLC Poller (WLC-P, i.e. the RF field generating charger device) should communicate with and charge a WLC Listener (WLC-L, i.e. the device under charge). Examples of WLC-L devices include accessories, such as fitness trackers, stylus pens or earbuds. As mentioned above, a wireless charging activity may take from several minutes up to several hours.

During most of the time of a WLC charging activity a continuous wave emission takes place. When such a continuous wave is emitted, no RF communication is performed. Recurrently, the WLC-P will poll the WLC-L and check for updates. For instance, the WLC-P will verify whether the WLC-L has reached a "battery full" status. The time duration between such communication polls may take from some seconds up to several minutes. The WLC-L is usually aware of the battery status and the required RF power to successfully complete the wireless charging operation. However, if the WLC-L wants to trigger a change in RF power emitted by WLC-P, it has to wait until the WLC-P is checking for updates. This behavior may be defined in the aforementioned technical standards: the WLC-L, which may be a card device, should wait for a request from the WLC-P, which may be a reader. Still, the WLC-L may be able to transmit a "WLC Stop Request" frame to trigger the WLC-P to ask WLC-related updates, in order to prevent long latencies, for example between the moment the WLC-L has an intention to request a change in the transmitted power and the moment the WLC-P becomes aware of this intention. Such a "WLC Stop Request" may be regarded as a communication event that should be detected by the WLC-P.

Another event which may have to be detected by the WLC-P is the removal of the WLC-L from the NFC channel through which the wireless power transfer (WPT) is performed. In a typical implementation, the WLC-P will detect removal of a WLC-L only as early as it performs the next polling communication. In other words, before this polling communication which is initiated by the WLC-P itself, the WLC-P will not receive any indication as to whether the WLC-L has been removed. This may cause a delay between the moment that the WLC-L is removed and the moment that the WLC-P disables the RF field. This delay, which may amount to several minutes, may cause an increased power consumption and a negative user experience (e.g., the NFC interface may be blocked).

Another event which may have to be detected by the WLC-P is the close proximity of another communication device to the NFC transceiver of the WLC-P. This other communication device may for example be a tag, which enters the RF field generated by the WLC-P while the WLC-L is being charged. In particular, upon request of the WLC-L, the WLC-P may emit RF fields above the H-field limits defined for RF communication by the NFC Forum. This allows faster energy transfer, but it can destroy tags which are brought into the proximity of the WLC-P device during the WLC activity. Therefore, the WLC-P should be able to detect the resonant device which is presented to the WLC-P. This device is referred to as a Foreign Object (FO) in the WLC specification of the NFC Forum. It is noted that the NFC Forum defines a background Foreign Object Detection (bFOD) as a method to detect the approach of additional counterparts, which detection should trigger a power reduction of strong emitted RF fields. Additionally, this method may be used to detect RF coupling changes caused by the removal of the WLC-L from the NFC channel. Furthermore, it is noted that said WLC specification defines the concept of bFOD, but not how to realize it on or integrate it into real hardware. However, it is assumed that the skilled person will be able to implement it in hardware.

NFC controllers often include a highly sensitive RF modem allowing to decode small load modulation signals of weakly covered tags. Thus, the RF modem receiver chain typically includes a low-noise, high-performance analog chain and an optimized digital signal processing (DSP) unit for regular reader-mode activities. Such reader-mode activities cover various use cases, tag and accessory reading and Bluetooth pairing triggered through an NFC channel. Since the RF modem includes a receiver as well as a transmitter, it may also be referred to as a transceiver. The high-performance receiver of the RF modem consumes a certain amount of power. Typical values for the RM modem's power dissipation are around 30 to 100 mW, depending on the device supply voltage.

NFC-based wireless charging is often used to charge accessories with a received power between 100 mW and 2 W. In other examples, the received power may be more than 15 W, which is common when wireless charging operations are performed in accordance with the Qi standard. It is noted that Qi is an open interface standard that defines wireless power transfer using inductive charging over distances of up to 4 cm, developed by the Wireless Power Consortium. The end-to-end power efficiency is defined by the ratio between the input power of the charged accessory and the required power provided by the charger battery. If this efficiency is too low, the WLC use case may not be fully enabled and the user experience may be negatively affected. Therefore, the excess power in the WLC-P should be minimized.

Now discussed are a near field communication device and a corresponding method of operating a near field communication device, which facilitate reducing the dissipated power in said near field communication device. In particular, the near field communication device may be used to efficiently perform wireless power transfer (WPT) operations to charge an external device under charge.

Figure 2:
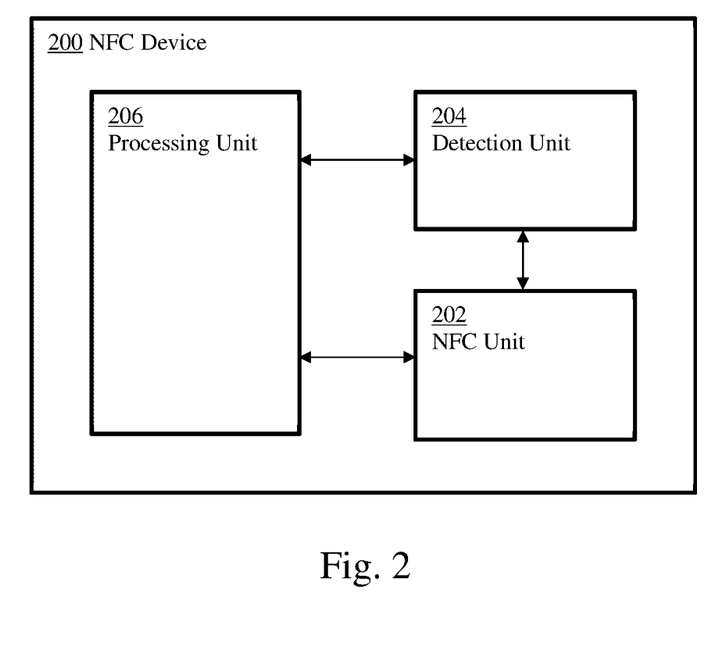
FIG. 2 shows an illustrative embodiment of an NFC device.

FIG. 2 shows an illustrative embodiment of an NFC device 200. The NFC device 200 comprises an NFC unit 202, a detection unit 204 and a processing unit 206. The NFC unit 202 is configured to charge an external device under charge (not shown) by transferring power to said device under charge through an NFC channel. The detection unit 204 is configured to detect predefined events occurring on the NFC channel when said power is being transferred to the device under charge. Furthermore, the processing unit 206 is configured to control the transferring of power to the device under charge in dependence on the events detected by the detection unit 204. In this way, the wireless power transfer operation may be controlled dynamically by adapting the operation as early as possible, without sending for example an explicit request for an update on the status of the device under charge. Accordingly, the likelihood that energy is wasted on, for example, an unnecessary continuation of the wireless power transfer operation may be reduced. It is noted that the NFC unit 202 may be an NFC transceiver of the kind set forth, i.e. a device which includes both a receiver and a transmitter. In other embodiments (not shown), the NFC unit 202 may only comprise a transmitter. Furthermore, it is noted that the term "device under charge" refers to a device that is being charged by said NFC unit.

In one or more embodiments, the processing unit 206 is further configured to disable, at least in part, a receiver comprised in the NFC unit 202 when said power is being transferred to the device under charge. In this way, the power consumed by the NFC device 200 may be further reduced. In particular, since a separate detection unit 204 is included for detecting events occurring on the NFC channel during a WPT operation, the high-performance receiver NFC unit 202 does not need to be used for this purpose. It is noted that disabling the receiver may be realized by switching off, at least in part, the receiver or putting the receiver at least in part in a power-down state, such as a sleep state. For example, only a set of submodules of the receiver may be switched off, while other submodules may remain active. In one or more embodiments, the processing unit 206 is further configured to enable the receiver in dependence on the events detected by the detection unit 204. In this way, the receiver is quickly put into operation if the detected events indicate that its functionality is needed.

In one or more embodiments, the processing unit 206 is further configured to interrupt the transferring of power to the device under charge in dependence on the events detected by the detection unit 204 or to conclude an ongoing continuous wave charging phase in dependence on the events detected by the detection unit. In this way, the wireless power transfer operation may be stopped as early as possible, such that no energy is wasted on a continuation of the wireless power transfer operation if the detected events indicate that the operation does not need to be continued. Whether the transferring of power is interrupted or the continuous wave charging phase is concluded, may depend on the type of event which is detected. For instance, after a stop pattern event, the transferring of power as such may not be interrupted, because this might cause an RF field reset. Instead, after a stop pattern event has been detected the most appropriate action may be to stop the ongoing charging cycle and to perform communication with the counterpart. In response to other events, for example when a foreign object is detected, the correct handling may be to disable the RF field (i.e., to interrupt the transferring of power) and to enable it again to poll for any present NFC counterparts.

In one or more embodiments, the predefined events include at least one of the following events: a data frame transmitted by the device under charge; a removal of the device under charge from the NFC channel; another communication device being brought into close proximity of the NFC unit 202. These predefined events are particularly suitable events for signaling to the processing unit that a certain action should be taken. For example, the data frame may comprise a stop pattern that indicates that the wireless power transfer should be interrupted. Similarly, a removal of the device under charge may indicate that the wireless power transfer should be interrupted. Furthermore, the close proximity of another communication device may indicate that at least the strength of the emitted HF field should be reduced, to avoid damaging the other communication device.

In one or more embodiments, the detection unit 204 includes a receiver signal monitor configured to monitor signal changes in a receiver path of the NFC unit 202, wherein said signal changes in the receiver path are indicative of one or more of the predefined events. In this way, the detection of the predefined events is facilitated. In particular, by monitoring signal changes in the receiver path, predefined events can be detected while the receiver of the NFC unit 202 is not in an active state. Furthermore, in one or more embodiments, the detection unit 204 includes a transmitter current monitor configured to monitor signal changes in a supply current path to a transmitter of the NFC unit 202, wherein said signal changes in the supply current path are indicative of one or more of the predefined events. In this way, the detection of the predefined events is facilitated. In particular, by monitoring signal changes in the supply current path to the transmitter, predefined events can be detected while the receiver of the NFC unit 202 is not in an active state.

In a practical implementation, the detection unit 204 further includes a decoder configured to decode inputs provided by the receiver signal monitor and the transmitter current monitor into detected events, and to notify the processing unit 206 of said detected events. This further facilitates the detection of the predefined events. Furthermore, in one or more embodiments, the decoder has settings which are programmable or configurable by a user. In this way, the detection of the predefined events can easily be optimized by the user. Furthermore, in one or more embodiments, the processing unit 206 is configured to enable and disable the decoder. In this way, the processing unit 206 can easily control whether the detection of predefined events is enabled or disabled. In a practical implementation, the decoder includes a filtering unit configured to filter the inputs provided by the receiver signal monitor and the transmitter current monitor before said inputs are decoded. In this way, the signal-to-noise ratio of the inputs can be increased, which may reduce the likelihood of wrongly detected events. In one or more embodiments, the decoder is configured to decode the inputs by detecting predefined patterns in the signal changes in the receiver path and/or the supply current path. In this way, the detection of the predefined events is further facilitated. In a practical implementation, the programmable or configurable decoder settings include one or more thresholds used for detecting the predefined patterns in said signal changes. This further facilitates optimizing the detection of the predefined events.

Figure 3:
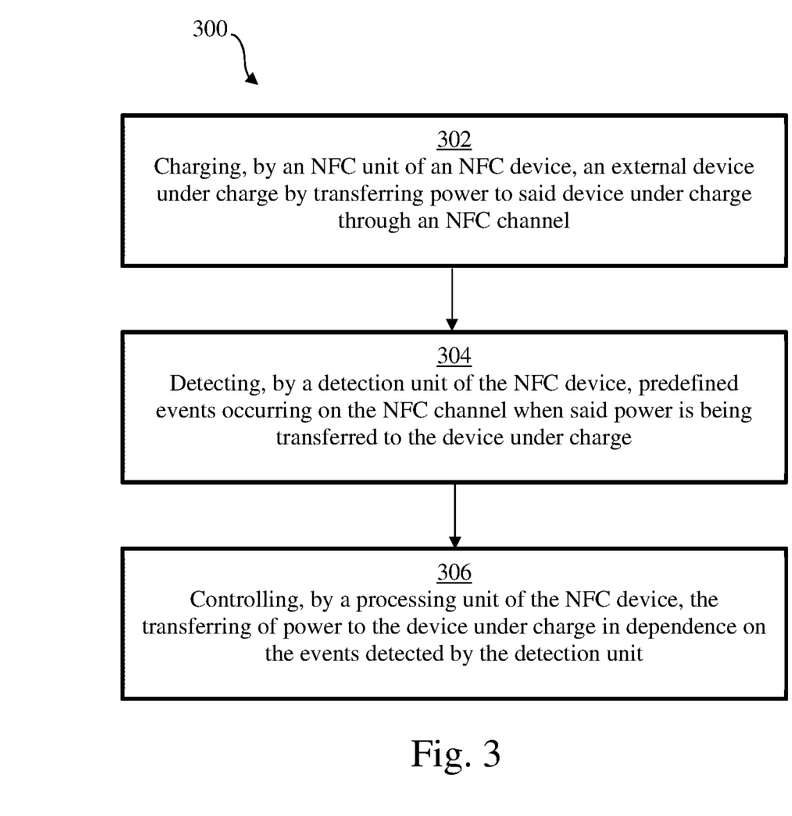
FIG. 3 shows an illustrative embodiment of a method of operating an NFC device.

FIG. 3 shows an illustrative embodiment of a method 300 of operating an NFC device. The method 300 includes the following steps. At 302, an NFC unit of an NFC device charges an external device under charge by transferring power to said device under charge through an NFC channel. At 304, a detection unit of the NFC device detects predefined events occurring on the NFC channel when said power is being transferred to the device under charge. Furthermore, at 306, a processing unit of the NFC device controls the transferring of power to the device under charge in dependence on the events detected by the detection unit. As mentioned above, the wireless power transfer operation may thereby be controlled dynamically by adapting the operation as early as possible, without sending for example an explicit request for an update on the status of the device under charge.

Figure 4:
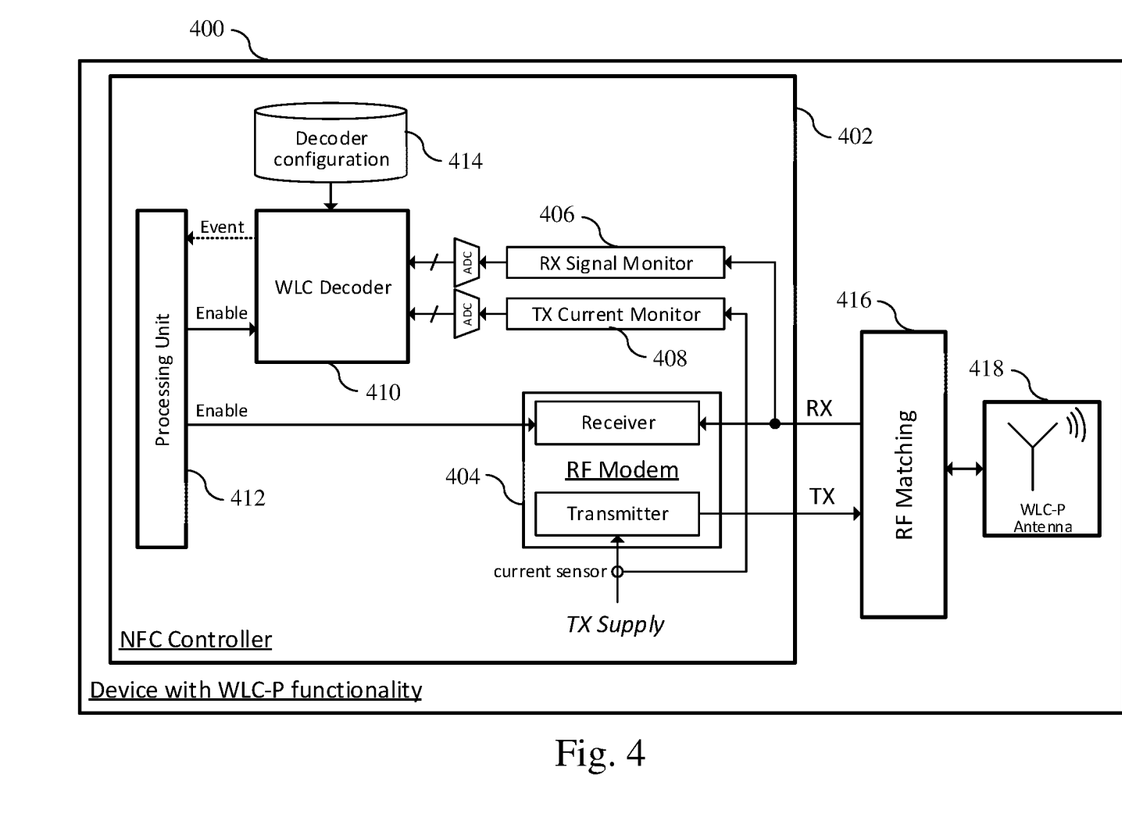
FIG. 4 shows an illustrative embodiment of a device with wireless charging poller (WLC-P) functionality.

FIG. 4 shows an illustrative embodiment of a device 400 with wireless charging poller (WLC-P) functionality. The device 400 includes an NFC controller 402 operatively coupled to an RF matching circuit 416 via a receiver (RX) path and a transmitter (TX) path. The device 400 further includes a WLC-P antenna 418 operatively coupled to the RF matching circuit 416. The WLC-P antenna 418 enables establishing an NFC channel through which power can be transferred to an external device under charge (not shown). The NFC controller 402 includes an RF modem 404 comprising a receiver and a transmitter, which enable receiving and transmitting signals to the external device under charge. Furthermore, the NFC controller 402 includes a receiver signal monitor 406 and a transmitter current monitor 408 that facilitate the detection of predefined events in the manner described above. In addition, the NFC controller 402 includes a WLC decoder and a processing unit 412 of the kind set forth above.

In accordance with the present disclosure, a detection unit is configured to predefined events occurring on an NFC channel when power is being transferred to the device under charge. Such a predefined event may for example be the transmission of a so-called "WPT Stop Request" by the device under charge. The format of this request is defined in the WLC Technical Specification issued by the NFC Forum. In particular, the "WPT Stop Request" is defined as a sequence of eight symbols consisting of a "pattern S". Thus, the term "pattern S" refers to a modulation symbol, and a plurality of "pattern S" symbols may form a WPT stop pattern. The "pattern S" symbol has a typical duration of 2 ms and half of the symbol has a positive or negative RF modulation. It is noted that a symbol rate of approximately 500 Hz is very slow compared to typical bit rates found in NFC communication. For example, typical bit rates for NFC are 106 kbps for the signaling types NFC-A and NFC-B and 26 kbps for the signaling type NFC-V. The latter signaling type may also be referred to as the "ICODE" signaling type, because it is used in so-called ICODE® tags. Other predefined events are the removal of the WLC-L from the NFC channel and the close proximity of so-called foreign objects to the WLC-P. These predefined events result in load changes on the WLC-P antenna, which can be detected using the receiver signal monitor 406 or a transmitter current monitor 408. For a typical NFC matching system, RF antenna load changes on the WLC-P antenna 418 result in an observable correlating change in the RF modem's TX supply current and RX input voltage envelope. It is noted that this change may be the same if WLC-L is removed or a foreign object is presented. Since the "pattern S" is also generated by load modulation on the NFC channel, it has a similar effect in terms of load changes on the WLC-P antenna 418 as the removal of the WLC-L and the proximity of a foreign object.

The aforementioned WLC Technical Specification also describes examples of actions that may be taken by the processing unit 412 in response to detecting the predefined events. These examples include the following actions. After a WLC stop pattern has been received, the WPT phase (continuous wave emission) and the WLC cycle are caused to end early. Furthermore, the WLC-P polls again for a WLC-L, which allows the WLC-L to update the WLC-P with the information that triggered the transmission of the stop pattern. This may allow the WLC-L to indicate that its battery is full, but also to request an increase or decrease of the RF field strength depending on the charge state of its battery. After a bFOD event has been detected, the WLC-P will stop the ongoing WLC cycle in order to prevent damage to the FO being resonant at 13.56 MHz. Furthermore, the WLC-P will check which FC counterparts are present in its vicinity. This is called "Polling FOD" and may include an RF field reset as well as a new activation sequence.

It is noted that the device 400 shown in FIG. 4 includes an NFC controller 402, but the presently disclosed concept is also applicable to lower level NFC front-end designs. The transmitter of the RF modem 404 may be used as a source to generate the RF field and a modulated reader signal. Furthermore, the receiver of the RF modem 404 may be used to receive counterpart load modulation signals for NFC communication. The receiver chain implementation may include an analog and digital portion. NFC communication systems should typically have a very high dynamic range including a high receiver sensitivity performance to detect low load modulation amplitude levels of loosely coupled counterparts (such as NFC tags at a distance of a few centimeters). It is noted that a WLC activity typically has a very high coupling between the WLC-P and WLC-L to achieve the power transfer and a high-power efficiency. However, the high RX detection sensitivity for regular reader mode reception results in a significant power consumption. For the WLC activity this high RX detection sensitivity may not be needed. Thus, in accordance with the present disclosure the RF modem's receiver, or sub-blocks of it, may be enabled or disabled by a control signal.

Furthermore, the NFC controller 402 has units 406, 408 to monitor receiver input signals and to monitor the transmitter supply current. It is noted that specific implementations may include only one of these units 406, 408. The digitized outputs of these units 406, 408 are provided to the WLC decoder 410. The WLC decoder 410 may have a user-programmable decoder configuration 414, which may be stored in a non-volatile memory. The decoder configuration 414 may include, for example, decoder threshold settings, timing definitions, and settings that define which input signal monitor should be used. Additionally, an enable signal may be used to power down the WLC decoder 410 when it is not needed. If the RX signal monitor 406 is used by the WLC decoder 410, then the RF modem's receiver input impedance may have to be kept constant while the WLC decoder 410 is active. Otherwise, input impedance changes may have a negative impact on the WLC decoder's detection performance. It is noted that WLC decoder implementations that rely only on the TX current as input signal may have an optimal power efficiency gain, because the complete receiver can be disabled.

The processing unit 412 may control both the WLC decoder 410 and the RF modem 404. Furthermore, any RF events detected by the WLC decoder 410 may be handled by the processing unit 412, for example by taking actions as defined in the aforementioned WLC Technical Specification. It is noted that this specification defines that the WLC activity uses looped WLC cycles after initial activation and setup. Each WLC cycle consists of an RF communication phase called WCC (wireless charging control) for exchanging charging control messages (power change requests, battery full indication, etc.) and the main wireless power transfer (WPT) phase. The WPT phase does not include regular NFC RF communication, but the following events may be detected during this phase: (i) WPT Stop Pattern frames sent by the WLC-L, (ii) removal of the WLC-L from the NFC channel, and (iii) a foreign object (FO) entering the operating volume of the WLC-P.

Figure 5:
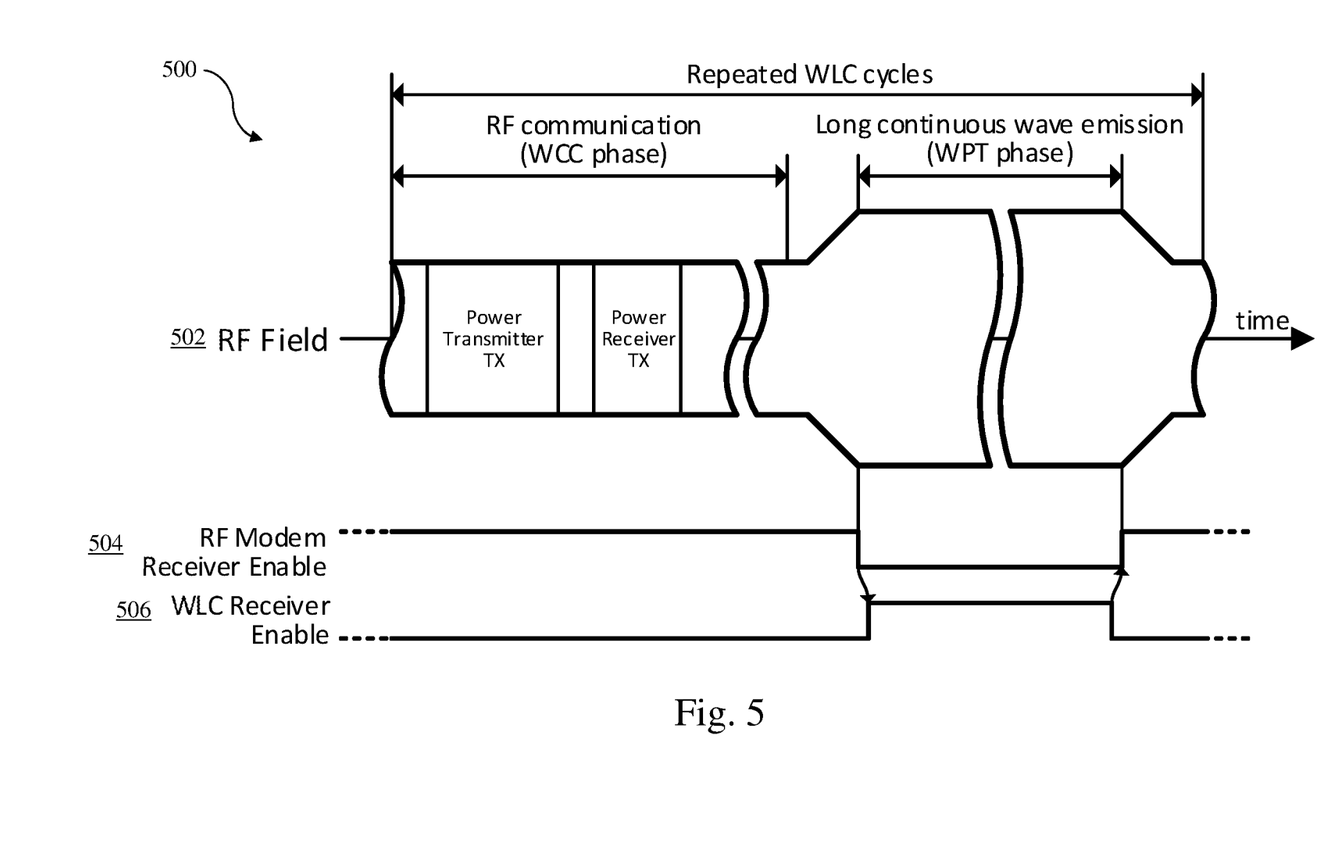
FIG. 5 shows an illustrative embodiment of a timing diagram of a near field communication device.

FIG. 5 shows an illustrative embodiment of a timing diagram 500 of a near field communication device. As shown in FIG. 5, the system may shut down the main RF modem's receiver to save power and to increase the end-to-end efficiency. The skilled person will appreciate that the NFC controller may implement further power saving measures in addition to shutting down the receiver. To detect events which may occur during the WPT phase, the NFC controller may enable the WLC decoder for RF event monitoring. During this time the WLC decoder monitors input metrics and raises corresponding RF events to the processing unit, which may take an appropriate action. For instance, the processing unit may disable the WLC decoder after any detected RF event and re-enable the RF modem's receiver for communication purposes.

Figure 6:
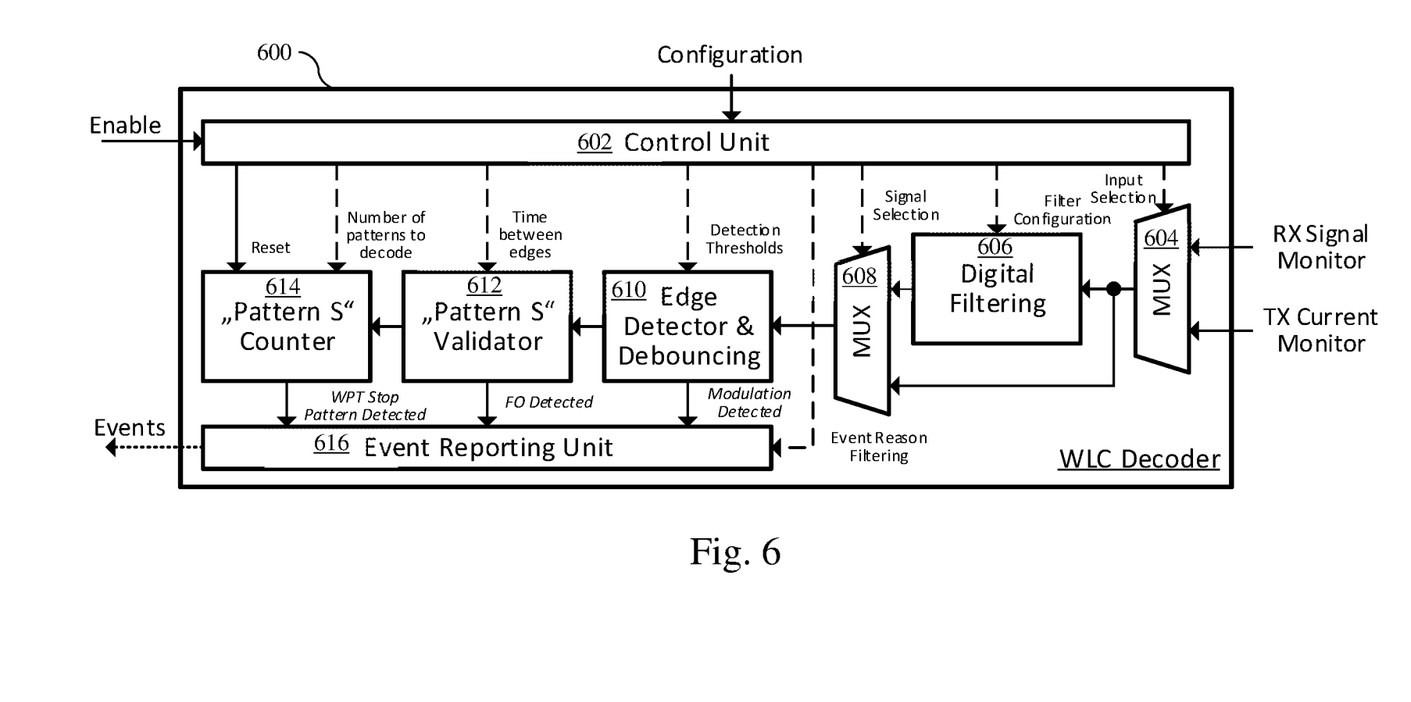
FIG. 6 shows an illustrative embodiment of a wireless charging (WLC) decoder.

FIG. 6 shows an illustrative embodiment of a wireless charging (WLC) decoder 600. The WLC decoder 600 comprises a control unit 602, a signal selection and pre-processing section, a main processing section and an event reporting unit 616. The control unit 602 is used to configure sub-blocks as defined in non-volatile memory by using control signals. These control signals are shown in FIG. 6 as dashed lines and are explained below for every related block. The signal selection and pre-processing section includes two multiplexers 604, 608 and a digital filtering unit 606. The first multiplexer 604 allows to select the input signal for the WLC decoder 600. Configurable digital filtering can be used to pre-process the input signal. Typically, a variant of low-pass filtering can be used for relatively slowly changing input signals for RF events to be detected. This may result in a significant signal-to-noise ratio improvement, which may prevent false alarm raised by the event detector (i.e., the main processing section). A second multiplexer 608 selects either the digitally filtered input signal or the raw input signal.

The main processing section includes an edge detector and debouncing unit 610, followed by a "pattern S" validator 612 and a "pattern S" counter 614. The edge detector and debouncing unit 610 uses digital signal processing methods to detect significant load changes in the observed signal trace and signals the detected load changes to the "pattern S" validator 612. A basic implementation may include a threshold-based comparator with a debouncer to prevent noise in the input signal, which may cause false alarms (i.e., wrongly detected events). It is noted that debouncing refers to a method to filter out "glitches" (i.e., short time outliers caused by for example interference or noise) in signals, thereby preventing that an edge detection is inadvertently triggered. A simple implementation of a debouncer may require that a signal stays above a threshold for a configurable minimum time before declaring this as an edge crossing. An improved implementation may use mathematical methods, such as methods based on first derivatives, to detect edges. The edge detector and debouncing unit 610 may take both rising edges and falling edges into account. The "pattern S" validator 612 verifies the timing between the detected edges. Only if the time between detected rising and falling edges is within a configurable target range, a "pattern S" symbol may be regarded as detected. This is signaled to the "pattern S" counter 614, which increments after every detected "pattern S" symbol. It is noted that the control unit 602 may reset the counter after the WLC decoder 600 has been enabled.

The event reporting unit 616 receives detected RF events like "Modulation detected", "FO detected", "WPT Stop Pattern Detected" from the main processing section. An event-reason filtering configuration may be available to control which RF events are provided as WLC decoder output. The output may be an interrupt signal to a processing unit and/or a status signal. The skilled person will appreciate that the WLC decoder 600 may have different detection thresholds (e.g., detection sensitivity configuration values) for "pattern S" detection and FO detection. It is noted that the FO detection may also be related to the removal of a WLC-L. That is to say, the load change effect observed by the WLC-P when a FO is presented may be similar to the load change effect observed when the WLC-L is removed. Thus, the reporting of the "FO detected" event may also be triggered by the removal of the WLC-L. The resulting system handling may also be the same: in both cases the action to be taken may be to check which NFC counterparts are present in the vicinity of the WLC-P's antenna.

Figure 7:
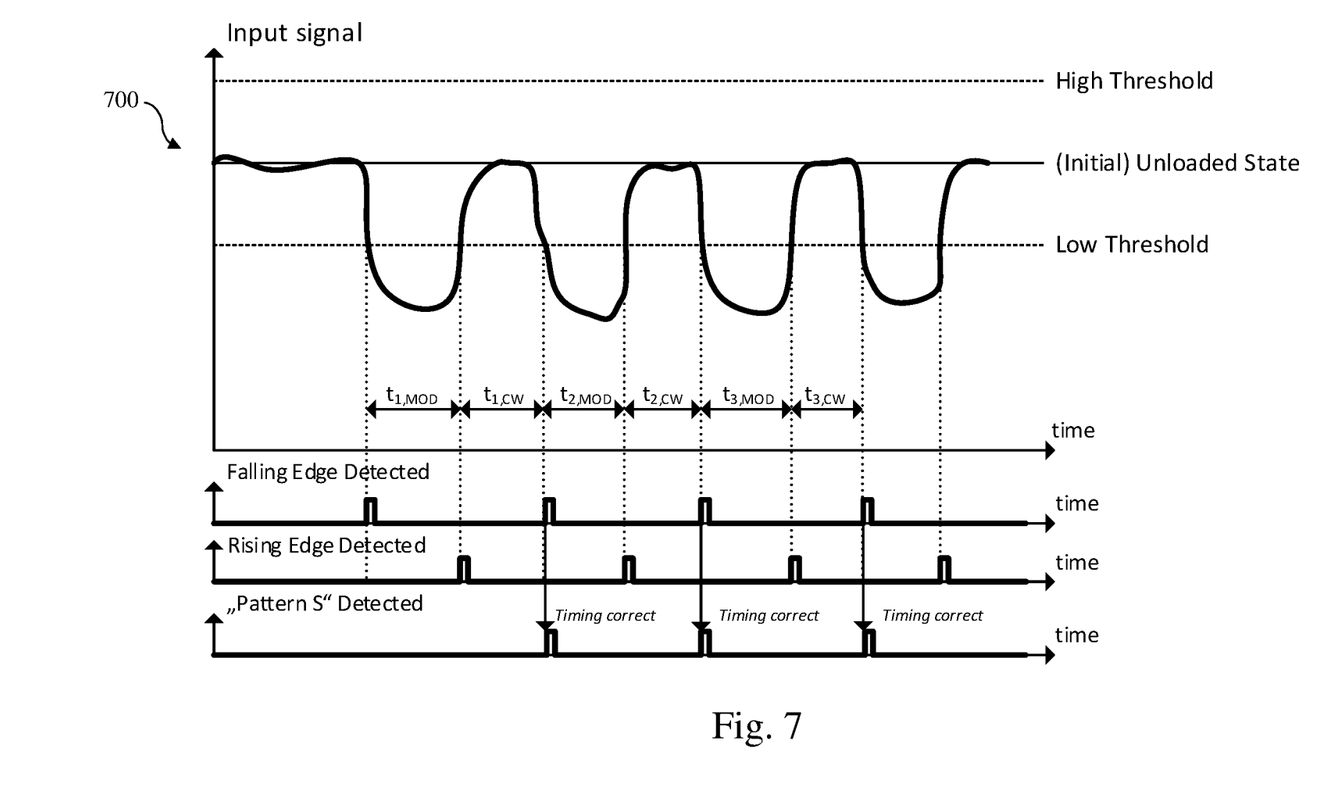
FIG. 7 shows an illustrative embodiment of a wireless power transfer (WPT) stop request decoding sequence.

FIG. 7 shows an illustrative embodiment of a wireless power transfer (WPT) stop request decoding sequence 700. In particular, the input signal trace and WLC decoder internal status signals used by the main decoder section are shown. Low and high thresholds are defined to allow a sensitive symbol detection above intrinsic signal noise levels. Rising and falling edge detection events are signaled to the aforementioned "pattern S" validator. Note that debouncing may be applied to prevent false alarms. The "pattern S" validator signals a "pattern S" detected event, if the preceding time differences between rising and falling edges are within the configured time ranges.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC-based wireless charging system
102 device with WLC-P functionality
104 NFC unit with WLC-P functionality
106 charger battery
108 device with WLC-L functionality
110 NFC unit with WLC-L functionality
112 charged battery
200 NFC device
202 detection unit
204 NFC unit
206 processing unit
300 method of operating an NFC device
302 charging, by an NFC unit of an NFC device, an external device under charge by transferring power to said device under charge through an NFC channel
304 detecting, by a detection unit of the NFC device, predefined events occurring on the NFC channel when said power is being transferred to the device under charge
306 controlling, by a processing unit of the NFC device, the transferring of power to the device under charge in dependence on the events detected by the detection unit
400 device with WLC-P functionality
402 NFC controller
404 RF modem
406 receiver signal monitor
408 transmitter current monitor
410 WLC decoder
412 processing unit
414 decoder configuration
416 RF matching circuit
418 WLC-P antenna
500 timing diagram of near field communication device
502 RF field
504 RF modem receiver enable signal
506 WLC receiver enable signal
600 WLC decoder
602 control unit
604 multiplexer
606 digital filtering unit
608 multiplexer
610 edge detector and debouncing unit
612 "pattern S" validator
614 "pattern S" counter
616 event reporting unit
700 WPT stop request decoding sequence Near Field Communication Device having an Event Detector

The invention claimed is:

1. A near field communication, NFC, device, comprising:
an NFC unit configured to charge an external device under charge by transferring power to said device under charge through an NFC channel;
a detection unit configured to detect predefined events occurring on the NFC channel when said power is being transferred to the device under charge; and
a processing unit configured to control the transferring of power to the device under charge in dependence on the events detected by the detection unit;
wherein the processing unit is further configured to disable, at least in part, a receiver comprised in the NFC unit when said power is being transferred to the device under charge;
wherein the detection unit includes a receiver signal monitor configured to monitor signal changes in a receiver path of the NFC unit, wherein said signal changes in the receiver path are indicative of one or more of the predefined events;
wherein the detection unit includes a transmitter current monitor configured to monitor signal changes in a supply current path to a transmitter of the NFC unit, wherein said signal changes in the supply current path are indicative of one or more of the predefined events; and
wherein the detection unit further includes a decoder configured to decode digital inputs received via the receiver signal monitor and the transmitter current monitor into detected events, and to notify the processing unit of said detected events.

2. The NFC device of claim 1, wherein the processing unit is further configured to enable the receiver in dependence on the events detected by the detection unit.

3. The NFC device of claim 1, wherein the processing unit is further configured to interrupt the transferring of power to the device under charge in dependence on the events detected by the detection unit or to conclude an ongoing continuous wave charging phase in dependence on the events detected by the detection unit.

4. The NFC device of claim 1, wherein the predefined events include at least one of the following events:
   a data frame transmitted by the device under charge;
   a removal of the device under charge from the NFC channel; and
   another communication device being brought into close proximity of the NFC unit.

5. The NFC device of claim 1, wherein the decoder has settings which are programmable or configurable by a user.

6. The NFC device claim 5, wherein the settings include one or more thresholds used for detecting the predefined patterns in said signal changes.

7. The NFC device of claim 1, wherein the processing unit is configured to enable and disable the decoder.

8. The NFC device of claim 1, wherein the decoder includes a filtering unit configured to filter the inputs provided by the receiver signal monitor and the transmitter current monitor before said inputs are decoded.

9. The NFC device of claim 1, wherein the decoder is configured to decode the inputs by detecting predefined patterns in the signal changes in the receiver path and/or the supply current path.

10. A method of operating a near field communication, NFC, device, the NFC device comprising an NFC unit, a detection unit and a processing unit, the method comprising:
    charging, by the NFC unit, an external device under charge by transferring power to said device under charge through an NFC channel;
    detecting, by the detection unit, predefined events occurring on the NFC channel when said power is being transferred to the device under charge; and
    controlling, by the processing unit, the transferring of power to the device under charge in dependence on the events detected by the detection unit wherein the processing unit disables, at least in part, a receiver comprised in the NFC unit when said power is being transferred to the device under charge;
    wherein the detection unit includes a receiver signal monitor, wherein said receiver signal monitor monitors signal changes in a receiver path of the NFC unit,
    wherein said signal changes in the receiver path are indicative of one or more of the predefined events;
    wherein the detection unit includes a transmitter current monitor, wherein said transmitter current monitor monitors signal changes in a supply current path to a transmitter of the NFC unit, wherein said signal changes in the supply current path are indicative of one or more of the predefined events; and
    wherein the detection unit further includes a decoder configured to decode digital inputs received via the receiver signal monitor and the transmitter current monitor into detected events, and to notify the processing unit of said detected events.

11. The method of claim 10, wherein the processing unit enables the receiver in dependence on the events detected by the detection unit.

12. The method of claim 10, wherein the processing unit interrupts the transferring of power to the device under charge in dependence on the events detected by the detection unit or concludes an ongoing continuous wave charging phase in dependence on the events detected by the detection unit.

13. The method of claim 10, wherein the predefined events include at least one of the following events:
    a data frame transmitted by the device under charge;
    a removal of the device under charge from the NFC channel; and
    another communication device being brought into close proximity of the NFC unit.

* * * * *